United States Patent [19]

Lanese et al.

[11] Patent Number: 5,670,840
[45] Date of Patent: Sep. 23, 1997

[54] TUNGSTEN-HALOGEN INCANDESCENT LAMP WITH REDUCED RISK OF CONTAINMENT FAILURE

[76] Inventors: Gustino J. Lanese, 11445 Kristine Dr., Chesterland, Ohio 44026; Frank E. Zalar, 2874 Lamplight La., Willoughby Hills, Ohio 44094; Ronald J. Olwert, 7039 Teal Cove, Concord Township, Ohio 44077

[21] Appl. No.: 975,296

[22] Filed: Nov. 12, 1992

[51] Int. Cl.$^6$ .................................................. H01J 61/34
[52] U.S. Cl. ........................................ 313/25; 313/580
[58] Field of Search ............... 313/25, 580; 315/73, 315/74

[56] References Cited

U.S. PATENT DOCUMENTS

| | | | |
|---|---|---|---|
| 4,398,124 | 8/1983 | Kohl et al. | 315/74 |
| 4,415,836 | 11/1983 | De Cuester et al. | 315/50 |
| 4,598,225 | 7/1986 | Gagnon | 313/579 |
| 4,888,517 | 12/1989 | Keeffe et al. | 313/25 |

FOREIGN PATENT DOCUMENTS

| | | |
|---|---|---|
| 1120974 | 7/1968 | United Kingdom. |
| 2144578 | 3/1985 | United Kingdom. |

Primary Examiner—Sandra L. O'Shea
Assistant Examiner—Vip Patel
Attorney, Agent, or Firm—Stanley C. Corwin

[57] ABSTRACT

A tungsten-halogen lamp has a light transmissive, IR coated, filament chamber enclosing a filament, the filament chamber being enclosed within an outer envelope. Fuses are connected to opposite ends of the filament to limit the magnitude and duration of an electrical arc across a break in the filament which, in combination with a fill gas pressure of no greater than 2500 Torr reduces the likelihood of containment failure.

17 Claims, 1 Drawing Sheet

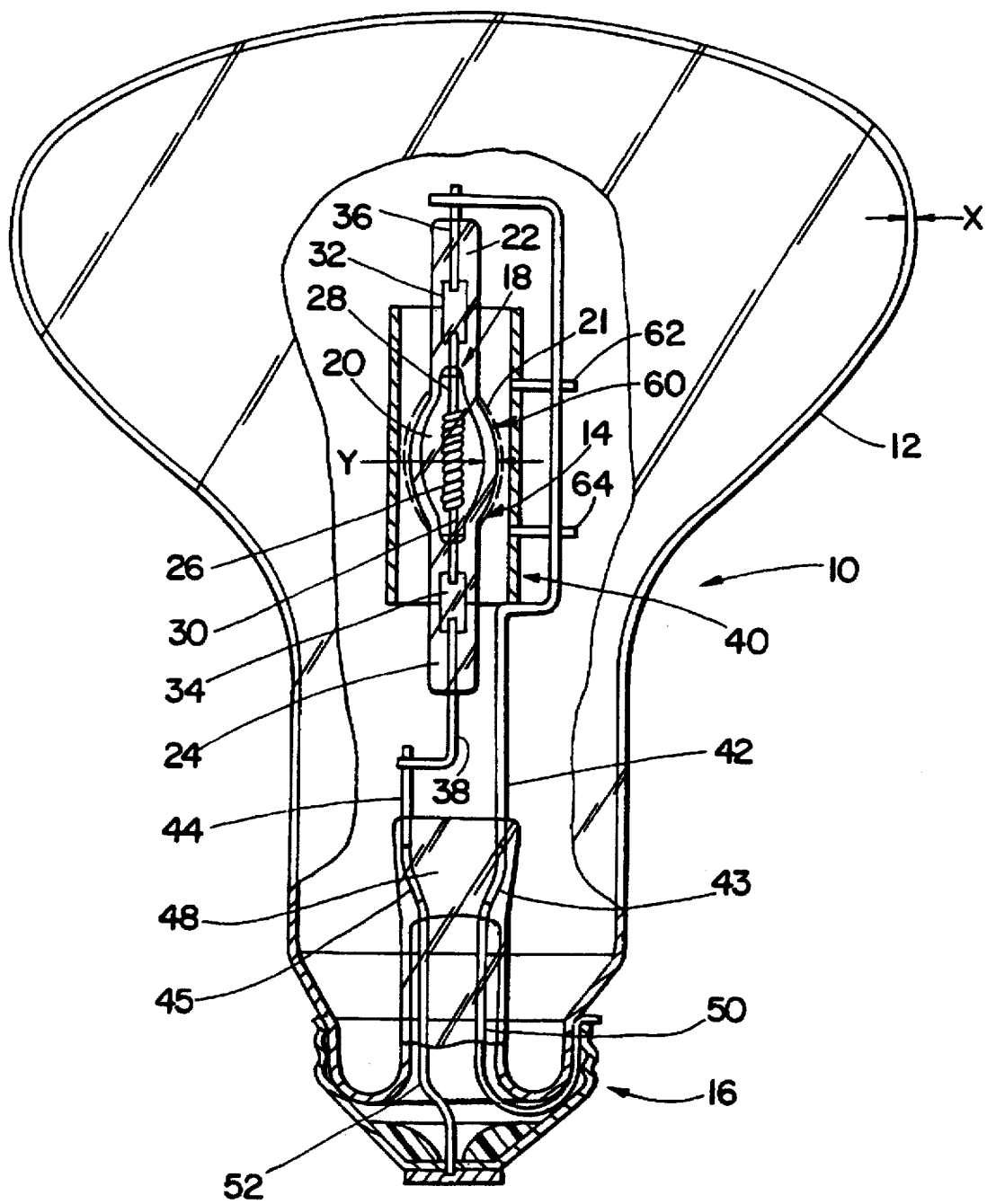

TUNGSTEN-HALOGEN INCANDESCENT LAMP WITH REDUCED RISK OF CONTAINMENT FAILURE

BACKGROUND OF THE INVENTION

1. Field of the Invention

The invention relates to a tungsten-halogen incandescent lamp, and more particularly to a tungsten-halogen incandescent lamp wherein a reduced fill pressure in combination with quick acting fuses substantially eliminates the risk of containment failure of the lamp.

2. Background of the Disclosure

As discussed in U.S. Pat. No. 4,942,331, assigned to General Electric Company, the assignee of the present invention, the disclosure of which is incorporated herein in its entireties by reference, double ended filament lamps enclosing a filament and hermetically sealed at both ends are well known in the art. These lamps are generally constructed of a quartz tube which forms a filament chamber that encloses an elongated, tungsten filament supported at both ends along its length with a molybdenum foil. The filament chamber generally contains one or more inert fill gases and is coated with a thin film, optical interference filter for reflecting infrared radiation, emitted by the filament, back to the filament while concurrently transmitting the visible light portion of the electromagnetic spectrum emitted by the filament. Infrared radiation reflected by the filter back to the filament is reconverted to light radiation in the visible portion of the electromagnetic spectrum, thereby greatly increasing the luminous efficiency of the lamp.

During the operation of filament lamps, tungsten is constantly being emitted from the surface of the filament. This tungsten would normally tend to collect on the surface of the filament chamber and slowly reduce the amount of light given off by the lamp. However, small amounts of gases within the chamber captures the tungsten evaporating from the filament and redeposits it on the hot filament. To suppress the evaporation, the pressure of the fill gas is typically about 4000 Torr, at room temperature.

With tungsten-halogen incandescent lamps, as discussed in U.S. Pat. No. 4,598,225, there is a small possibility that the tungsten-halogen lamp will fracture during its operation. On the infrequent occasion that a lamp fractures, the sequence of events within the lamp is usually as follows: the inner light source capsule bursts causing fragments of glass or shards to be propelled against the outer envelope. There is even a possibility that the outer envelope of the lamp could fracture. This type of lamp failure will hereinafter be referred to as a "containment failure" of the lamp. As discussed in the U.S. Pat. No. 4,598,225 patent listed before, various methods have been suggested to improve the ability of tungsten-halogen lamps to withstand a burst of the inner, light-source capsule. These methods include attempting to restrict shards from impacting against the outer envelope, reinforcing the outer envelope so it will not fracture in the event shards are propelled against it or a combination of both.

These methods of containment necessitate additional hardware and result in increased costs of manufacture and a decrease in lamp efficiency. Accordingly, there is a need for tungsten-halogen lamps and a method of manufacturing same which provides a solution to the containment problems of the prior art and concurrently provides a high luminous efficiency in the lamps.

OBJECTS AND SUMMARY OF THE INVENTION

In accordance with the invention, a tungsten-halogen lamp includes a light transmissive, inner filament chamber enclosed about a filament. Fill gas within the filament chamber has a room temperature pressure of 1500–2500 Torr for reducing the likelihood of the filament chamber rupturing in the event of an electrical arc across a filament fracture.

Fuse means are connected to first and second opposite ends of the filament assembly for limiting the duration and magnitude of an electrical arc in the event of filament fracture, whereby the likelihood of the filament chamber rupturing is substantially reduced. The filament chamber is coated with an infrared reflecting and visible light transmitting coating (IR coating). The inert fill gas is selected from the group consisting essentially of argon, xenon, krypton, halogen and compounds thereof along with minor amounts of nitrogen. The lamp includes an outer glass envelope in spaced relationship with the filament chamber, and a base member supporting the inner and outer envelopes to form a incandescent light bulb. A lamp according to the invention having the low fill pressure, filament fuses and IR coating has been found to be safe with no reduction in lamp life and yet still provide a high lumen output compared to prior art lamps. By way of an illustrative, but non-limiting example, lamps according to the invention operated at 120 volt over a 60–100 watt power range will produce from 23–30 lumens per watt (LPW) over a life of 2500 hours.

If desired, in one embodiment a lamp of the invention may also include a shroud disposed about the filament chamber.

BRIEF DESCRIPTION OF THE DRAWINGS

The FIGURE illustrates a incandescent lamp, partially cut away to show a tungsten-halogen lamp disposed within the outer envelope of the lamp.

DETAILED DESCRIPTION OF THE INVENTION

Referring to the FIGURE, an incandescent lamp 10 is illustrated. The lamp 10 has an outer envelope 12 formed of a light transmissive material in surrounding relation to a light source 14. An electrically conductive base 16, with a screw-in portion, is connected to the outer envelope 12. While a screw-in base is illustrated, it is within the terms of the invention to substitute other types of conventional bases.

Light source 14 includes a double ended, envelope portion 18 with a filament chamber 20 having a spherical, elliptical or cylindrical shape or a combination of such shapes. The outer diameter of the filament chamber 20 is greater than that of the end tube portions 22 and 24. Preferably, the filament chamber is constructed of a fused quartz material having a wall thickness, y, between 23–39 mils. While a double ended envelope is illustrated and described herein, it is also within the terms of the invention to substitute a single ended envelope portion, as disclosed in U.S. Pat. No. 4,743,803, previously listed.

The filament chamber 20 contains a coating or filter 21 on its outer surface which reflects infrared radiation emitted by the filament 26 disposed therein back to the filament and which transmits visible light radiation. Although any suitable optical interference filter may be used, the lamps of this invention are preferably coated with a multilayer, optical interference coating comprising alternating layers of refractory metal oxides, such as tantala, titania, niobia, hafnia and mixtures thereof, with silica presently being the material of choice for the low refractive index materials. These materials and their application and use for IR lamp coatings are known to those skilled in the art. The lamps of the invention and those of the examples below are coated with over 40 alternating coatings of silica and tantala, and the like, as is disclosed in U.S. Pat. No. 5,138,219, assigned to General Electric Company, the disclosure of which is incorporated herein in its entireties by reference, for selectively reflecting and transmitting different portions of the electromagnetic spectrum emitted by the filament. In a preferred embodiment of the invention, the filter 21 will reflect infrared radiation back to the filament and transmit the visible portions of the spectrum.

The filament 26, typically a double coil tungsten filament, has inner leads 28 and 30 which are welded to molybdenum foils 32 and 34. Outer filament leads 36 and 38 are welded to the opposite ends of molybdenum foils 32 and 34 and comprise the complete filament assembly 40. The filament assembly 40 is positioned in the double ended, lamp envelope 18.

An important aspect of the invention relates to the pressure and type of fill gas within filament chamber 20. The specific room temperature pressure range of the fill gas is an important aspect of the invention, as discussed in detail hereinafter. The filament chamber 20 is flushed and then filled with an inert gas such as argon, xenon or krypton along with minor (i.e., <10%) amounts of nitrogen, and one or more halogen compounds. U.S. Pat. No. 4,810,932, assigned to the assignor of the present invention, the disclosure of which is incorporated herein in its entireties by reference, discloses a suitable manufacturing process for making lamps of the type discussed herein.

The completed lamp 10 comprises filament chamber portion 18 containing filament assembly 40 wherein both tubular end portions 22 and 24 are shrink sealed over foil members 32 and 34 to form a hermetic seal with the chamber 20 containing an inert fill gas, as listed above. Outer filament leads 36 and 38 extend past the end of tubular portions 22 and 24 and are cut to the desired lengths. The outer envelope 12 is attached to base 16, by means such as cement, and contains an inert gas, such as nitrogen or noble gas or mixture thereof. Typically, the outer envelope is a glass having a wall thickness, x, of 15–40 mils.

Another important aspect of the invention relates to the ratio of the thickness of the wall of outer envelope wall 12 to the thickness of the wall of filament chamber 20. As discussed before, the outer envelope is constructed with a wall thickness, x, of 15–40 mils and the filament chamber 20 is constructed with a wall thickness, y, of 23–39 mils. In lamp 10, the ratio x/y, herein referred to as the "wall-thickness ratio", is substantially less than 3, such as between 1.74–0.38 and preferably less than 1.3 and most preferably less than 0.65. This is in contrast to the thick glass outer jacket disclosed in the previously listed U.S. Pat. No. 4,598,225 patent having a ratio of outer envelope wall thickness to filament chamber wall thickness of approximately equal to or greater than 3.

Light source 14 is mounted to the conductive base 16 of the illustrated reflector lamp 10 by means of first and second conductive mounting leg wires 42 and 44. Mounting leg wire 42 is connected, typically by welding, at a first end to the free end of outer lead 36 while the second end of leg wire 42 projects into a flare 48. Mounting leg 44 is connected, typically by welding, at a first end to outer lead 38 while the other second end projects into flare 48. The second ends of leg wires 42 and 44, which project into flare 48, are each welded to a first end of first and second Dumet wires 43 and 45, respectively. The Dumet wires are hermetically sealed to the flare material.

Moreover in accordance with the invention, the fuse means includes first and second fuse wires each being connected in series with the first and second opposite ends of the filament assembly. The first and second fuse wires begin acting within between about 1 and 3 half cycles of electrical current directed into the lamp and melt within approximately 6 cycles. The fuse means further includes first and second conductive mounting leg wires being connected by the first ends to the first and second opposite ends of the filament assembly, respectively. First and second Dumet wires are connected to second ends of the said first and second mounting leg wires, respectively. The first and second fuse wires are connected at their first ends to the first and second Dumet wires, respectively, and at their opposite second ends to the metal base. The first and second fuses are elongated pieces of wire which can be made from essentially pure, degassed nickel.

Thus, first fuse wire 50, which is welded at a first end to the second end of Dumet wire 43, projects out from the bottom end of flare 48 and has a second end in electrical contact with the side of metal base 16. A second fuse wire 52, which is welded at a first end to the second end of Dumet wire 45, projects out from the bottom end of flare 48 and has a second end in electrical contact with the bottom of metal base 16. The first and second fuse wires 50 and 52 can be selected from conventional fuse wire material, such as for example, degassed nickel wire designed to begin acting within about 1 to 3 half cycles of typical household inlet power, i.e., 120 volts at 60 Hz. At about 6 cycles, the fuse wires are designed to melt and break electrical contact. The fuse wires 50 and 52, in combination with the fill gas at the set pressure range, prevent containment failure in accordance with the present invention, as discussed below.

The room temperature pressure within light source 14 of the inert fill gas, as described above, is preferably between 1500 and 2500 Torr. During operation, the gas pressure increases about 2.5 to about 3 times.

An important aspect of the invention relates to the increase in temperature and pressure of the gas within the light source caused by a runaway arc (discussed below) across a gap formed by a break or fracture of the filament. The fill pressure, set in the range established by the present invention, does not increase enough to cause containment failure when the filament breaks and a runaway arc is formed across the gap in the filament. That is, the pressure range set by the invention has been found to be low enough so that when the pressure within the filament chamber 20 increases because of the temperature generated by a runaway arc across the gap, the resulting containment pressure remains below the amount needed to burst the filament chamber 20 before the arc is extinguished. Thus, containment failure is prevented.

By way of illustrative, but non-limiting examples, 60 watt and 100 watt lamp lumen output are compared for non-IR coated filament tubes and also for IR coated filament tubes to shown the impact of reducing the filament tube pressure on lamp efficacy. The term "efficacy" used herein is a measure of total luminous flux emitted by a light source, expressed in lumens per watt. The volume of the filament chambers for the 60 Watt tubes is 0.54 cubic centimeters (cc) and the volume of the filament chambers for the 100 Watt tubes is 0.57 cc. The lamps employed a xenon fill gas doped with less than 10% $N_2$ and less then 1% $PH_3$ and $CH_3BR$.

At constant life, reducing the fill pressure in a 60 W halogen lamp from 4000 Torr to 2000 Torr will result in a efficacy drop of approximately 8%. In TABLE 1 below, the efficacy of a 60 Watt 120 Volt Non-IR coated lamp drops from 17.6 to 16.2 LPW at constant life.

TABLE 1

A 60 Watt, 120 Volt, 3000 Hour Life Lamp

| Room Temperature Pressure | Filament Tube LPW | |
|---|---|---|
| (TORR) | Non-IR | IR Coated |
| 4000 | 17.6 | 26.0 |
| 2000 | 16.2 | 24.0 |

As indicated in TABLE 2 below, at constant life, reducing the fill pressure of an IR coated, halogen lamp operating at 100 Watt from 4000 Torr to 2000 Torr will result in a efficacy drop of approximately 8%.

TABLE 2

A 100 Watt, 120 Volt, 3000 Hour Life Lamp

| Room Temperature Pressure | Filament Tube LPW | |
|---|---|---|
| (TORR) | Non-IR | IR Coated |
| 4000 | 20.0 | 29.0 |
| 2000 | 18.4 | 26.7 |

However, the LPW of the IR coated lamp at 2000 Torr, in TABLE 1 is 24 LPW as compared to 17.6 LPW for a non-IR coated lamp at 4000 Torr. This is approximately a 36% gain in efficacy. Similarly, the LPW of the IR coated lamp at 2000 Torr, in TABLE 2 is 26.7 LPW as compared to 20.0 LPW for a non-IR coated lamp at 4000 Torr. This is approximately a 34% gain in efficacy.

While the exact efficacy of a halogen or incandescent lamp depends on the lamp wattage, voltage and life, the efficacy of an IR coated filament tube at between 1500–2500 Torr is at least 25% greater then a non-IR halogen filament tube at 4000 Torr of the same wattage, voltage and life and preferably between 25–36% greater than a non-IR halogen filament tube at 4000 Torr of the same wattage, voltage and life.

While the reduced pressure of the fill gas is in itself sufficient to prevent containment failure in the event of a filament fracture and corresponding runaway current, an additional safety feature of providing quick acting fuses is also incorporated in the invention. To provide an additional safety measure under all circumstances, even those not yet considered, first and second quick acting fuses 50 and 52 are provided between the source of power (not shown), base 16, and the first and second opposite ends of filament assembly 40. These fuses 50 and 52 are typically constructed of about 9 mil diameter wire of pure, degassed nickel. The fuses are selected to begin working within about 1 to about 3 half cycles of the electric power entering the bulb, typically about 120 volts and 60 Hz. and then melt after about 6 cycles to break electrical contact. The fuses are also selected to withstand a power spike of up to about 140 volts without blowing. The fuses are needed because in the event that the filament fractures an arc is generated across the resulting gap whose amperage will rise or runaway from the normal about 0.5 amperes to between about 15–30 amperes and even as high as between about 100 and 300 amperes.

In the prior art lamps, heat generated by a runaway arc increased the pressure and temperature of the already high pressure fill gas and caused the filament chamber 20 to burst and possibly result in a containment failure. However, with the lower pressure fill gas of the present invention, a runaway arc is extinguished before the filament chamber 20 ruptures and containment failure occurs. Still to be especially safe, the double fuses 50 and 52 limit the duration and magnitude of the arc so that the likelihood of the filament chamber rupturing is substantially reduced.

Another aspect of the invention relates to containment failure caused by the filament chamber rupturing due to voids, cracks, pockets, bubbles and the like in the filament chamber, which no matter how small, may propagate with time and eventually crack. This can happen when the light is not even on. While this is a rare occurrence, it is worthwhile to protect against such a possibility. Therefore a shroud 60, typically a hollow glass or fused quartz cylinder, is disposed about in spaced relation from the filament chamber 20. Glass connector brackets 62 and 64 can secure the shroud 60 to the mounting leg 42. If the filament chamber ruptures, the pieces of glass or shards will most likely strike against the walls of the shroud first. Then they will fall through an open end of the shroud but without the force and velocity to break the outer envelope on contact. While the shroud is illustrated in conjunction with the fuses, it is also within the terms of the invention to use the shroud either alone or with either the fuses or the low pressure fill gas or both. Also, if desired, lamp 10 can be constructed without any shroud.

While the invention has been described and illustrated with a reflecting incandescent lamp, it is also within the terms of the invention to substitute other bulbs such as a pressed aluminized reflector (PAR), a globe or an A-line. The invention may also be used employing a single-ended tungsten-halogen light source.

We claim:

1. A lamp comprising:
   an outer envelope formed from light-transmissive material, the outer envelope having a wall thickness, $x$;
   a tungsten-halogen light source comprising a light transmissive filament chamber enclosing a filament, the filament chamber being coated with an infrared reflecting and visible light transmitting coating, the filament chamber having a wall thickness, $y$;
   an inert fill gas within the filament chamber having a room temperature pressure of no greater than 2500 Torr;
   an assembly that mounts the light source within the outer envelope; and
   a wall thickness ratio, $x/y$, of less than 0.65 whereby the likelihood of the outer envelope fracturing is substantially reduced.

2. The lamp as defined in claim 1 wherein the light source has a light output of between 23–30 LPW over an operating life of 2500 hour.

3. The lamp as defined in claim 1 wherein the gas comprises an inert gas selected from the group consisting essentially of argon, xenon, krypton, halogen and compounds thereof along with minor amounts of nitrogen.

4. The lamp of claim 1 further comprising a fuse including first and second fuse wires each being connected with first and second opposite ends of the filament, the first and second fuse wires acting within between 1 and 3 half cycles of electrical current directed into the lamp and melting within approximately 6 cycles.

5. The lamp of claim 4 wherein the fuse further includes:
   first and second conductive mounting leg wires being connected at a first end to the first and second opposite ends of the filament, respectively;
   first and second Dumet wires connected to a second end of the first and second mounting leg wires, respectively; and the first and second fuse wires being connected at a first end to the first and second Dumet wires and at an opposite second end to the metal base.

6. The lamp of claim 5 wherein the first and second fuse wires are elongated pieces of wire made from essentially pure, degassed nickel.

7. The lamp of claim 6 wherein the chamber is fused quartz.

8. The lamp of claim 6 wherein the outer envelope is vitreous glass.

9. The lamp of claim 1 further including a shroud disposed about the chamber for reducing the force and velocity of shards or pieces of the chamber propelled upon the fracture of the chamber.

10. The lamp of claim 1 wherein the fill pressure is between 1500–2500 Torr.

11. The lamp of claim 1 further comprising at least one fuse connected to a first end of the filament for limiting the duration and magnitude of an electrical arc in the event of filament fracture.

12. The lamp of claim 1 wherein the light source is a 60 W lamp that operates at approximately 120 V and has a room temperature pressure of approximately 2000 Torr.

13. The lamp of claim 1 wherein the light source is a 100 W lamp that operates at approximately 120 V and has a room temperature pressure of approximately 2000 Torr.

14. A lamp comprising:

an outer envelope formed from light-transmissive material, the outer envelope having a wall thickness, x;

a double ended, tungsten-halogen light source comprising a light transmissive filament chamber enclosing a filament, the filament chamber being coated with an infrared reflecting and visible light transmitting coating, the filament chamber having a wall thickness, y;

an inert fill gas within the filament chamber having a room temperature pressure of no greater than 2500 Torr;

a wall thickness ratio, x/y, of less than 0.65; and a fuse connected to at least one of first and second opposite ends of the filament for limiting the duration and magnitude of an electrical arc in the event of a filament fracture whereby the likelihood of the outer envelope rupturing is substantially reduced, the fuse beginning to act within 1 and 3 half cycles of electrical current directed into the lamp and melting within approximately 6 cycles.

15. The lamp of claim 14 wherein the pressure is between 1500–2500 Torr.

16. The lamp of claim 14 wherein the light source output is between 23–30 LPW over an operating life of 2500 Torr.

17. The lamp of claim 14 wherein said fuse further includes:

first and second conductive mounting leg wires being connected at a first end to first and second opposite ends of the filament, respectively;

first and second wires connected to a second end of first and second mounting leg wires, respectively; and the fuse being connected at a first end to one of the first and second wires and at an opposite second end to a metal base.

* * * * *